(No Model.)

L. A. FRANKENBERG.
ATTACHMENT FOR BICYCLES.

No. 527,549. Patented Oct. 16, 1894.

WITNESSES
F. L. Ourand
Jos. Gregory

INVENTOR
Louis A. Frankenberg
by Finckel & Finckel, Attorneys

THE NORRIS PETERS CO., PHOTO-LITHO., WASHINGTON, D. C.

UNITED STATES PATENT OFFICE.

LOUIS A. FRANKENBERG, OF COLUMBUS, OHIO.

ATTACHMENT FOR BICYCLES.

SPECIFICATION forming part of Letters Patent No. 527,549, dated October 16, 1894.

Application filed July 18, 1894. Serial No. 517,844. (No model.)

*To all whom it may concern:*

Be it known that I, LOUIS A. FRANKENBERG, a citizen of the United States residing at Columbus, in the county of Franklin and State of Ohio, have invented certain new and useful Improvements in Attachments for Bicycles; and I do hereby declare the following to be a full, clear, and exact description of the invention, such as will enable others skilled in the art to which it appertains to make and use the same.

The object of my invention is to provide a simple, light, and inexpensive attachment for bicycles and similar vehicles upon which a tent may be supported.

My invention consists of an arm or arms preferably made extensible, adapted to be attached to the frame of a bicycle which shall constitute the ridge pole of the tent.

Figure 1:
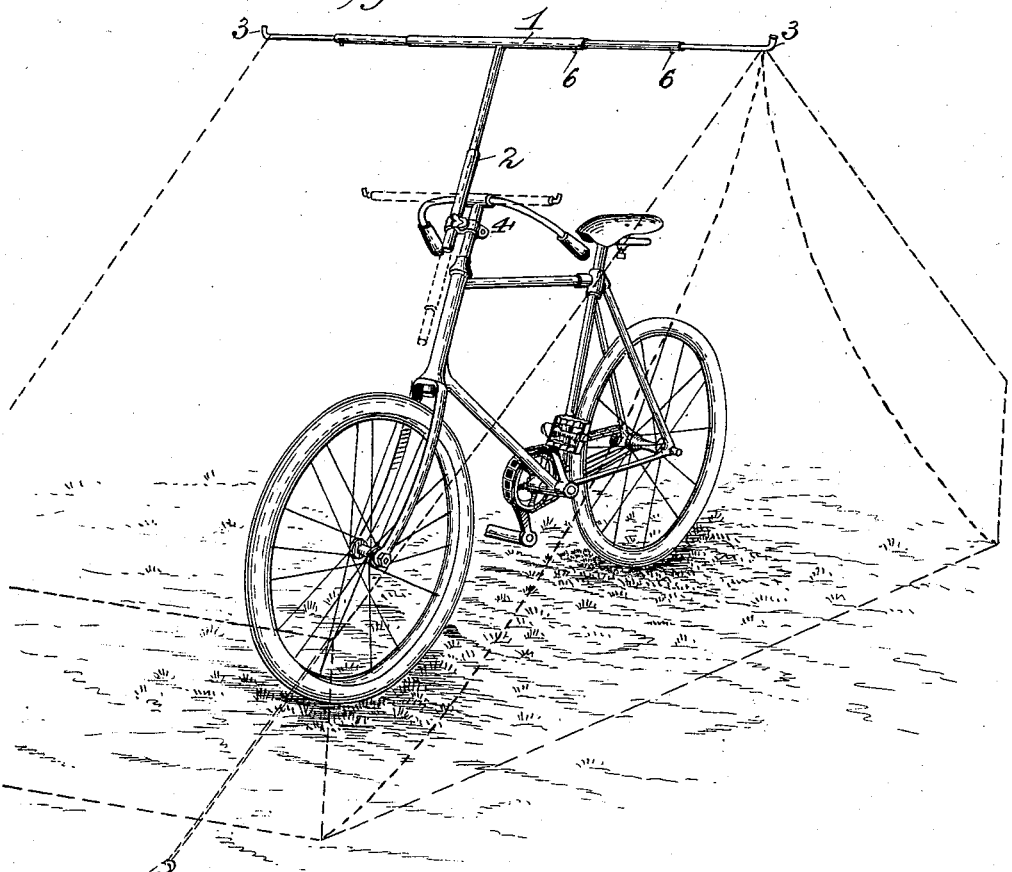
Figure 2:
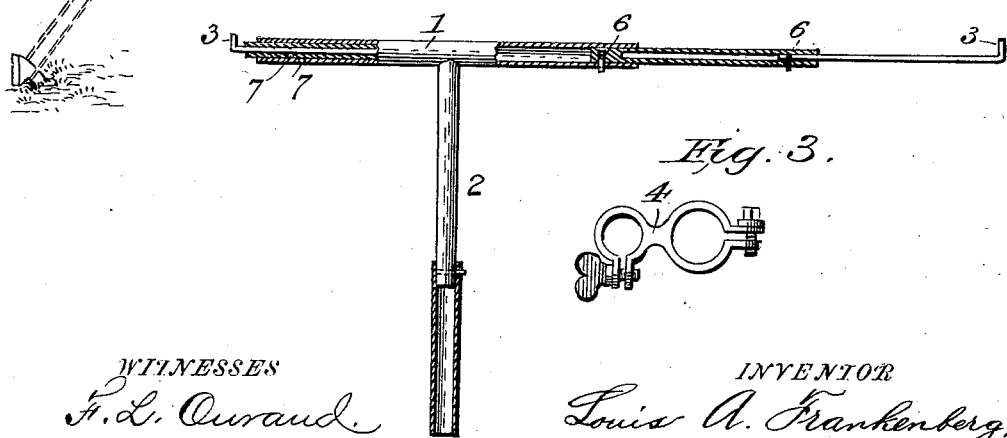
Figure 3:

In the accompanying drawings, Figure 1 is a view of the attachment in use. Fig. 2 is a sectional view of the device; and Fig. 3 a top plan view of a clamp used for connecting the attachment to the bicycle.

Like characters of reference in the different views indicate corresponding parts.

The attachment shown is of T-form, the horizontal portions 1 being each composed of several telescoping parts. The shank or vertical part 2 of the attachment may be telescoping also if desired, but this will be determined by the demand of the trade. The ends of the arms 1 are provided with hooks 3 to which guys may be attached in securing the bicycle in upright position.

The attachment is secured to the front part of the bicycle frame by means of a double clip 4, one part of the clip being secured to the frame immediately below the handle bar while the other part receives the shank of the attachment.

In a single tent one of the arms 1 is omitted and instead of telescoping the parts of the arms they may be hinged together.

When the parts are telescoped together spring actuated pins 6 engaging holes 7 may be employed to prevent the parts from separating when drawn out, but the manner of accomplishing this is optional.

When not in use the arms are pushed in and the attachment pushed down below or even with the handle bar as seen by dotted lines Fig. 2.

My invention will be found of great service to wheelmen going upon a journey in which they expect to remain out for one or several nights.

The apparatus is exceedingly light, adding little to the weight of the vehicle. It will also be found useful in case of rain as the tent will afford protection to the bicycle as well as the rider.

What I claim, and desire to secure by Letters Patent, is—

1. A ridge pole of a tent, a shank on said pole, and a clip for securing the same to bicycles and similar vehicles, substantially as described.

2. A ridge pole of a tent made horizontally extensible, a shank on said pole, and a clip for securing the same to bicycles and similar vehicles, substantially as described.

3. A ridge pole of a tent, and extensible shank on said pole, and a clip for securing the same to bicycles and similar vehicles, substantially as described.

4. A ridge pole of a tent made horizontally extensible, an extensible shank on said pole, and a clip for securing the same to bicycles and similar vehicles, substantially as described.

5. A tent attachment for bicycles and similar vehicles having extensible arms and hooks on the ends thereof to receive guys for securing the bicycle in upright position, substantially as described.

In testimony whereof I affix my signature in presence of two witnesses.

LOUIS A. FRANKENBERG.

Witnesses:
H. N. REID,
GEORGE M. FINCKEL.